United States Patent
Liao et al.

(10) Patent No.: US 11,082,212 B2
(45) Date of Patent: Aug. 3, 2021

(54) SYSTEM AND METHOD FOR COMMUNICATION SERVICE VERIFICATION, AND VERIFICATION SERVER THEREOF

(71) Applicant: Industrial Technology Research Institute, Hsinchu (TW)

(72) Inventors: Xin-Lan Liao, Hsinchu (TW); Lih-Guong Jang, Hsinchu (TW); Yi-Chang Wang, Hsinchu (TW); Yi-Yuan Chen, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 88 days.

(21) Appl. No.: 15/854,316

(22) Filed: Dec. 26, 2017

(65) Prior Publication Data
US 2019/0199522 A1    Jun. 27, 2019

(51) Int. Cl.
*H04L 9/08* (2006.01)
*H04L 29/06* (2006.01)
(Continued)

(52) U.S. Cl.
CPC .......... *H04L 9/0819* (2013.01); *H04L 9/0894* (2013.01); *H04L 9/321* (2013.01);
(Continued)

(58) Field of Classification Search
CPC ..... H04L 9/321; H04L 9/0819; H04L 9/0894; H04L 63/08; H04L 63/0428; H04W 12/04;
(Continued)

(56) References Cited

U.S. PATENT DOCUMENTS 7,017,041 B2    3/2006 Sandhu et al.
9,100,370 B2 *  8/2015 Bollay ............... H04L 63/0853
(Continued)

FOREIGN PATENT DOCUMENTS

CN    1595865 A    3/2005
CN  102289634 A   12/2011
(Continued)

OTHER PUBLICATIONS

H. Lee et al., "RollingLight: Enabling Line-of-Sight Light-to-Camera Communications," MobiSys '15, Proceedings of the 13th Annual International Conference on Mobile Systems, Applications, and Services, May 18-22, 2015, pp. 167-180.
(Continued)

*Primary Examiner* — Kevin Bechtel
*Assistant Examiner* — Sangseok Park
(74) *Attorney, Agent, or Firm* — Mintz Levin Cohn Ferris Glovsky and Popeo, P.C.; Peter F. Corless; Steven M. Jensen

(57) ABSTRACT

The present disclosure provides a system and a method for communication service verification and a verification server thereof. The method includes: obtaining a light code from a light code transmission device through a user device; demodulating the light code by the user device to generate a cipher; receiving a service request sent from the user device by a service system server; receiving a verification request sent from the user device or the service system server by a verification server; and retrieving a decryption key by the verification server based on the verification request, so as to decode the cipher in the verification request using the decryption key and obtain a decoding result.

12 Claims, 18 Drawing Sheets

(51) Int. Cl.
  *H04L 9/32* (2006.01)
  *H04W 12/04* (2021.01)
  *H04W 12/06* (2021.01)
(52) U.S. Cl.
  CPC .......... *H04L 63/08* (2013.01); *H04W 12/04* (2013.01); *H04L 63/126* (2013.01); *H04W 12/06* (2013.01)
(58) Field of Classification Search
  CPC . H04W 12/06; H04W 12/01; H04W 12/0433; H04W 12/0471; H04B 10/116
  See application file for complete search history.

(56) References Cited

U.S. PATENT DOCUMENTS

| | | | |
|---|---|---|---|
| 9,287,977 B2 | 3/2016 | Oshima et al. | |
| 2002/0018568 A1* | 2/2002 | Weaver, III | H04L 12/1836 380/241 |
| 2014/0101444 A1* | 4/2014 | Lee | H04L 63/0428 713/168 |
| 2016/0149867 A1* | 5/2016 | Lohr | H04B 10/85 380/256 |
| 2016/0204859 A1* | 7/2016 | Schenk | H05B 37/0245 398/118 |
| 2017/0099136 A1* | 4/2017 | Straub | H04L 9/0819 |
| 2018/0054423 A1* | 2/2018 | Liu | H04B 10/116 |
| 2019/0080321 A1* | 3/2019 | Mundis | G06Q 20/065 |

FOREIGN PATENT DOCUMENTS

| | | |
|---|---|---|
| CN | 103516702 A | 1/2014 |
| CN | 103812657 A | 5/2014 |
| CN | 104394134 A | 3/2015 |
| TW | 201625029 A | 7/2016 |
| TW | 201642603 A | 12/2016 |

OTHER PUBLICATIONS

K. Jo et al., "DisCo: Display-Camera Communication Using Rolling Shutter Sensors," ACM Transactions on Graphics, vol. 35, No. 5, Article 150, Jul. 2016, pp. 150:1 to 150:13.

H. Aoyama et al., "Line Scan Sampling for Visible Light Communication: Theory and Practice," IEEE International Conference on Communications (ICC), Optical Networks and Systems Symposium, 2015, pp. 5060-5065.

H. Aoyama et al., "Visible Light Communication Using a Conventional Image Sensor," 12th Annual IEEE Consumer Commerications and Networking Conference (CCNC), 2015, pp. 103-108.

* cited by examiner

SYSTEM AND METHOD FOR COMMUNICATION SERVICE VERIFICATION, AND VERIFICATION SERVER THEREOF

BACKGROUND

1. Technical Field

The present disclosure relates to communication service verification techniques, and, more particularly, to a system and method for communication service verification and a verification server thereof.

2. Description of Related Art

At present, brick-and-mortar stores and exhibitions usually use QR codes or Bluetooth wireless communications as the main transmission carrier for interacting with users. However, most of the Bluetooth devices currently available are omnidirectional, which means that they radiate UHF waves uniformly in all directions and may push notifications without users' knowing of presence of the information. The QR code size, on the other hand, limits the scanning distance, occupies display space, and could be concealed by the crowd. Queueing for scanning QR codes hinders not only visitor circulation but interaction experience. As a result, there is still room for improvement in the interactive technologies currently used in brick-and-mortar stores and venues.

The popularization of LEDs or OLEDs and smartphones has promoted the development of optical wireless communications and become a global trend. One of the key drivers leading to the adoption of optical wireless communications (OWC) is its applications in interactive advertisements and indoor positioning services, where the communication modules are embedded in lighting systems, billboards, and the like. In particular, the applications in brick-and-mortar stores will be a significant source of value creation in retail industry. The frequency of OWC spectrum is beyond terahertz (430-770 THz), which enables the capability of providing high speed data transmission. In addition, OWC spectrum is complementary and non-interfering to all existing radio frequency communications. As a result, dual functions of lighting and data communication can be achieved by using energy-efficient LED lights.

OWC enables data communication of lighting or display devices and has brought forth innovative applications such as Location-Based Service (LBS) and Internet of Things (IoT), creating value-added smart commerce solutions by improving interaction experience. Users can intuitively capture optical ID signals through optical sensors mounted on their mobile devices to obtain light codes. This interaction provides visual association so users can connect the object with its information. Vendors may also collect data in order to understand user behavior and preferences or analyze their product portfolio and marketing strategies. However, current OWC typically transmits optical ID signal in plaintext. Optical ID signal is imperceptible to human eyes but can be captured by specific devices, resulting in the risks of unauthorized access or even data overwrite.

Therefore, there is a need for a communication service verification mechanism, in particular, a mechanism that verifies user permissions to receive information through OWC.

SUMMARY

The present disclosure is to provide a system for communication service verification, which may include: a user device for obtaining a light code from a light code transmission device and demodulating the light code to generate a cipher; a service system server for receiving a service request from the user device; and a verification server for receiving a verification request including the cipher from the user device or the service system server, wherein a decryption key is retrieved based on the verification request, and the cipher is decoded using the decryption key to obtain a decoding result, which is transmitted to the service system server, and the service system server retrieves contents that correspond to the service request based on the decoding result and transmits the contents to the user device.

The present disclosure is also to provide a method for communication service verification, which may include: obtaining, by a user device, a light code from a light code transmission device; demodulating, by the user device, the light code to generate a cipher; receiving, by a service system server, a service request from the user device; receiving, by a verification server, a verification request from the user device or the service system server; and retrieving, by the verification server, a decryption key based on the verification request and decoding the cipher in the verification request using the decryption key to obtain a decoding result.

The present disclosure is to further provide a verification server for performing decoding and verification for a communication service. The verification server may include: a storage unit for storing a verification table that contains service system parameters and the corresponding decryption keys of a plurality of service systems; a request handling unit for receiving external verification requests, wherein a verification request includes a cipher and the service system parameters of the corresponding service system; and a signal decoding unit for retrieving a decryption key from the verification table based on the service system parameters to decode the cipher and obtain a decoding result, then the decoding result is returned via the request handling unit.

DETAILED DESCRIPTION OF THE EMBODIMENTS

The present disclosure is described by the following specific embodiments. One skilled in the art to which the present invention pertains can readily understand the spirit of the embodiments upon reading the disclosure of the specification.

Figure 1:
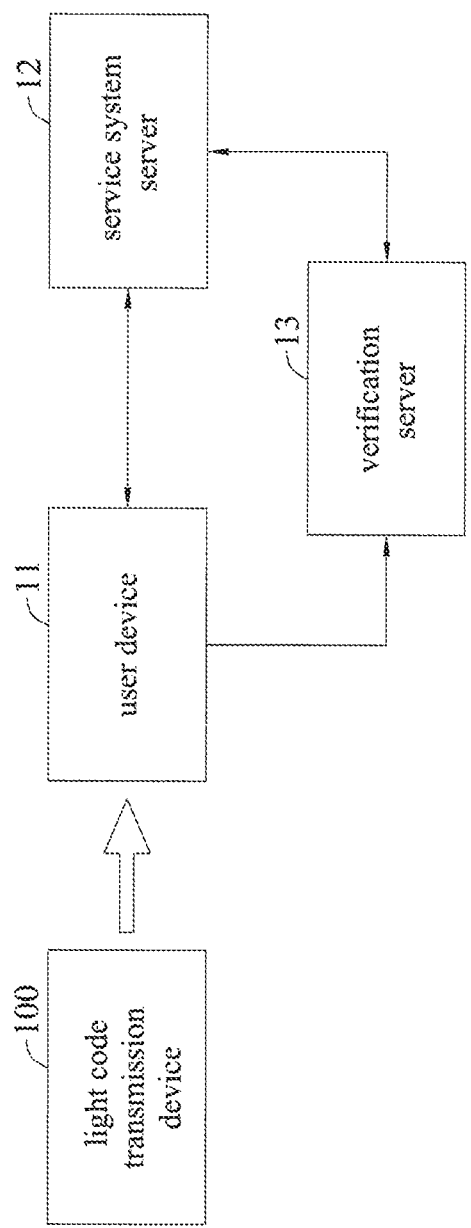
FIG. 1 is a block diagram depicting the architecture of a system for communication service verification in accordance with an embodiment of the present disclosure.

FIG. 1 is a block diagram depicting the architecture of a system for communication service verification in accordance with an embodiment of the present disclosure. As shown, the communication service verification system includes: a user device 11, a service system server 12 and a verification server 13.

The user device 11 is used for obtaining a light code from a light code transmission device 100 and demodulating the light code to generate a cipher. In other words, the user device 11 captures optical ID signals transmitted by the light code transmission device 100 by an optical sensor to obtain a light code. The user device 11 then performs demodulation to obtain a payload carried by the light code, and sends out a service request. The payload of the light code may include a device serial number and an identifier, which are described in more details later on.

The light code transmission device 100 may be a light emitting diode (LED) or an organic LED (OLED). More specifically, LEDs and OLEDs may be components integrated into various products, and the light code transmission device 100 may be a lighting device, a display device, a verification terminal, etc., which integrate LEDs or OLEDs and a driver circuit to transmit light codes. The descriptions below take an LED lighting device for example, in which an LED lighting device emits flashing light, and an optical sensor of the user device 11 captures the optical ID signals emitted by the LED lighting device and performs signal processing technology and demodulation process in communication systems. Thereby, the LED lighting device not only offers illumination, but also acts as a transmission medium for data communication.

The service system server 12 receives the service request from the user device 11. From the application, the user device 11 may know who the service provider is. Thus, upon obtaining and demodulating the light code, the user device 11 sends a service request to the service system server 12 hosted by the service provider to retrieve the contents corresponding to the service request.

Although the service system server 12 stores the contents, the entities of the requested contents remain unknown before verification is performed in order to prevent unauthorized access or even data overwrite. As the cipher is decoded by the verification server 13, the decoding result will be transmitted to the service system server 12, which then knows the requested contents of the service request and can respond to the user device 11.

The verification server 13 receives a verification request from the user device 11 or the service system server 12, wherein the verification request includes the cipher. The verification server 13 retrieves a decryption key corresponding to the verification request from a pre-stored verification table. The decryption key is used to decode the cipher to obtain a decoding result. As described before, the verification server 13 receives a verification request and retrieves a decryption key corresponding to the verification request, and decodes the cipher in the verification request using the decryption key to obtain a decoding result.

Next, the decoding result is transmitted to the service system server 12. Based on the decoding result, the service system server 12 retrieves the contents corresponding to the service request and transmits it to the user device 11. As can be seen from the above, verification has to be performed in order to know the entities of the contents corresponding to the service request, that is to say, the verification server 13 notifies the service system server 12 of the permission to provide this service.

As mentioned earlier, the verification request may come from either the user device 11 or the service system server 12. These are two different types of verification mechanism. One requires the user device 11, upon obtaining the light code, to send a service request to the service system server 12 and a verification request to the verification server 13, and after verification, the verification server 13 notifies the service system server 12 to provide service.

The other mechanism requires the user device 11, upon obtaining the light code, to send a service request to the service system server 12, which then sends a verification request to the verification server 13, and after verification, the verification server 13 notifies the service system server 12 to provide service. In this verification mechanism, the cipher is transmitted along with the service request to the service system server 12.

The verification table can be stored in an external database or in the verification server 13. If the verification table is stored in an external database, the decryption key required for the verification process of the verification server 13 is obtained from the external database.

In embodiment, the service system server 12 and the verification server 13 can be set up in the same apparatus or in separate apparatuses. In the case that the service system server 12 and the verification server 13 are set up in the same apparatus, the service system server 12 obtains in advance the decryption key from a key issuing server and performs verification process based on the verification request in the service system server 12.

Figure 2:
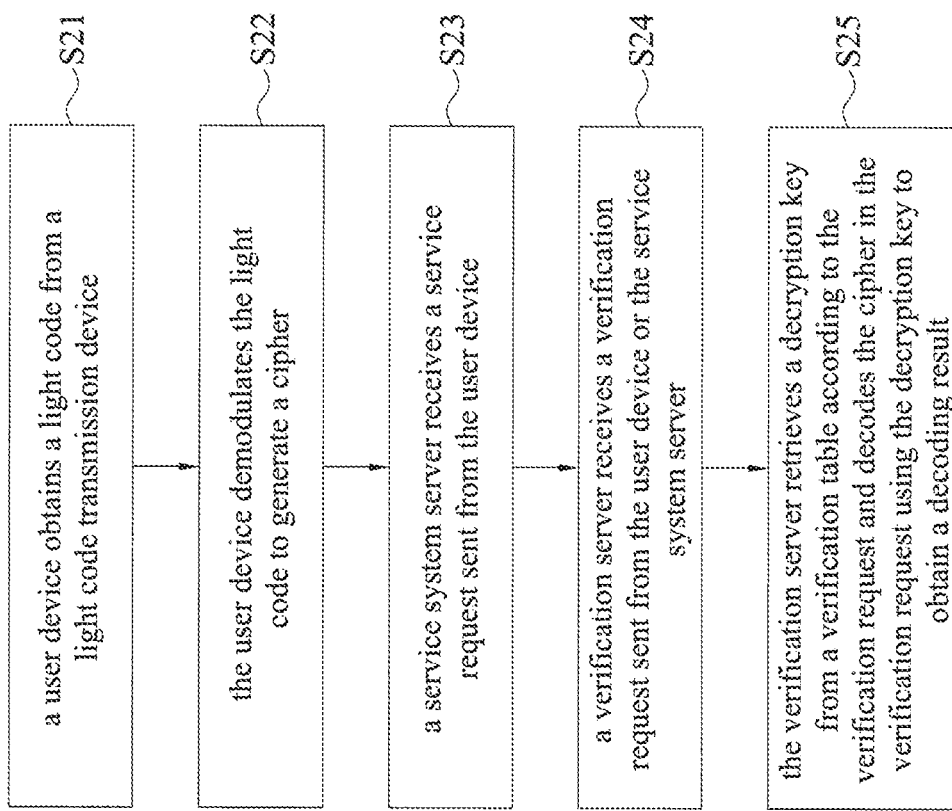
FIG. 2 is a flowchart illustrating a method for communication service verification in accordance with an embodiment of the present disclosure.

FIG. 2 is a flowchart illustrating a method for communication service verification in accordance with an embodiment of the present disclosure. At step S21, a user device obtains a light code from a light code transmission device. The light code transmission device emits high-speed flashing optical ID signals using an LED lighting device. The user device captures the optical ID signals transmitted by the LED lighting device using an optical sensor to obtain the light code.

At step S22, the user device demodulates the light code to generate a cipher. The user device may, upon obtaining the light code, perform demodulation process to obtain the payload carried by the light code.

At step S23, a service system server receives a service request sent from the user device. Upon demodulating the light code, the user device obtains the payload of the light code. Then, the user device sends the service request to the service system server hosted by a service provider.

At step S24, a verification server receives a verification request sent from the user device or the service system server. In order to prevent unauthorized user from accessing the contents stored in the service system server, the service system server does not know the entities of the requested contents corresponding to the cipher until the verification process is completed in the verification server. Therefore, the verification server may receive the verification request from the user device or the service system server.

In an embodiment, if the verification server receives the verification request from the service system server, which means that the cipher is transmitted along with the service request to the service system server, and the service system server then sends the verification request to the verification server. Alternatively, if the verification server receives the verification request from the user device, the user device sends the service request to the service system server and the verification request to the verification server at the same time.

It should be noted that the execution order of steps S23 and S24 can be swapped. In other words, either step S23 or step 24 can be performed after step S22, and then the other one is performed. There is no particular order in which the user device sends respective requests to the service system server and the verification server.

At step S25, the verification server retrieves a decryption key from a verification table according to the verification request and decodes the cipher in the verification request using the decryption key to obtain a decoding result. Step S25 reveals that the verification server decodes/verifies the cipher in the verification request using a pre-stored decryption key.

In an embodiment, the verification table is stored in an external database. During verification, the verification server retrieves the decryption key from the database.

In another embodiment, the verification table is stored within the verification server, meaning that the verification server can retrieve a decryption key from its own verification table.

Moreover, after step S25, the decoding result is transmitted to the service system server, which then retrieves the contents corresponding to the service request based on the decoding result and transmits the contents to the user device.

Figure 3A:
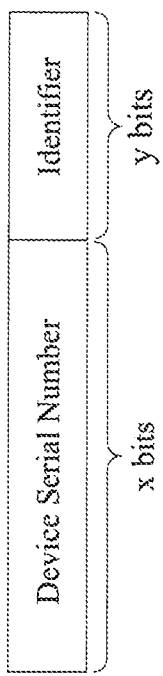
FIGS. 3A and 3B are schematic diagrams depicting a light code and an associated packet in accordance with an embodiment of the present disclosure.
Figure 3B:
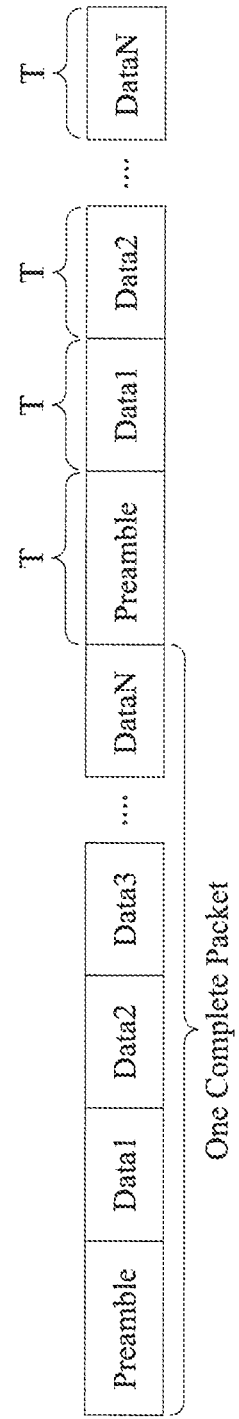

FIGS. 3A and 3B are schematic diagrams depicting a light code and an associated packet in accordance with an embodiment of the present disclosure. As shown in FIG. 3A, the light code includes a device serial number and an identifier, wherein the device serial number is unique to LED lighting devices. The service system server can associate one or more contents with the light code or part of the light code (e.g., the device serial number, the identifier, etc.) so as to provide the corresponding service for the user device.

As shown in FIG. 3B, the packet of a light code includes two types of symbols, a preamble and data symbols with fixed duration of emitting flashing light. As such, the LED lighting devices are able to carry and transmit optical ID signals.

Light codes can be transmitted by Frequency-Shift Keying (FSK) modulation. Assume that an LED lighting device can emit high-speed flashing light with f frequencies that are detectable to the optical sensor but imperceptible to human eyes, each of the flashing frequencies corresponds to a symbol, representing $\log_2 f$ data bits. Therefore, a light code is a bit stream with a multiple of $\log_2 f$ in length. Let the device serial number and the identifier consist of x and y bits, respectively, then the light code has to be expressed by at least $(x+y)/\log_2 f$ symbols for data transmission. Let $N \geq (x+y)/\log_2 f$, FIG. 3B shows the packet of a light code, which includes a preamble and data symbols that correspond to respective LED flashing frequencies for modulation, implementation details of which can be found by referring to TW Patent Application No. 106126391 filed by the present applicant, but the present disclosure is not limited as such.

Figure 4A:
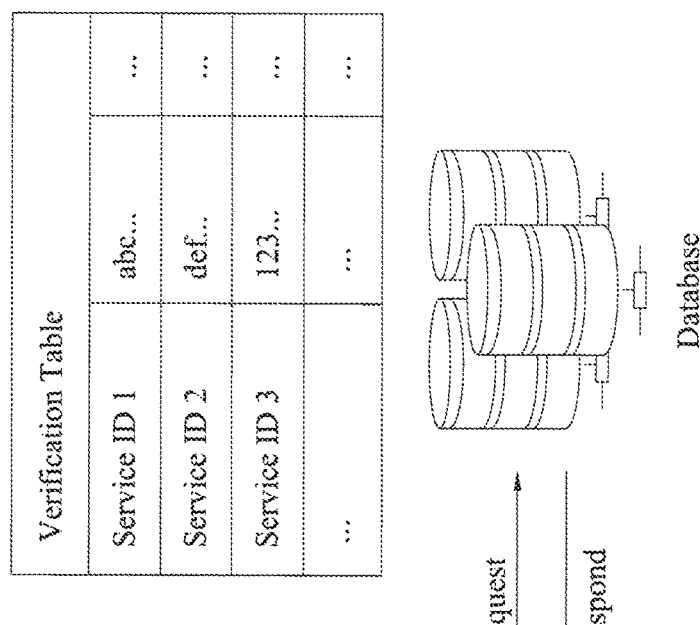
FIGS. 4A and 4B are an operational architecture diagram and a sequence diagram depicting the communication service verification in accordance with a first embodiment of the present disclosure, respectively.
Figure 4A:
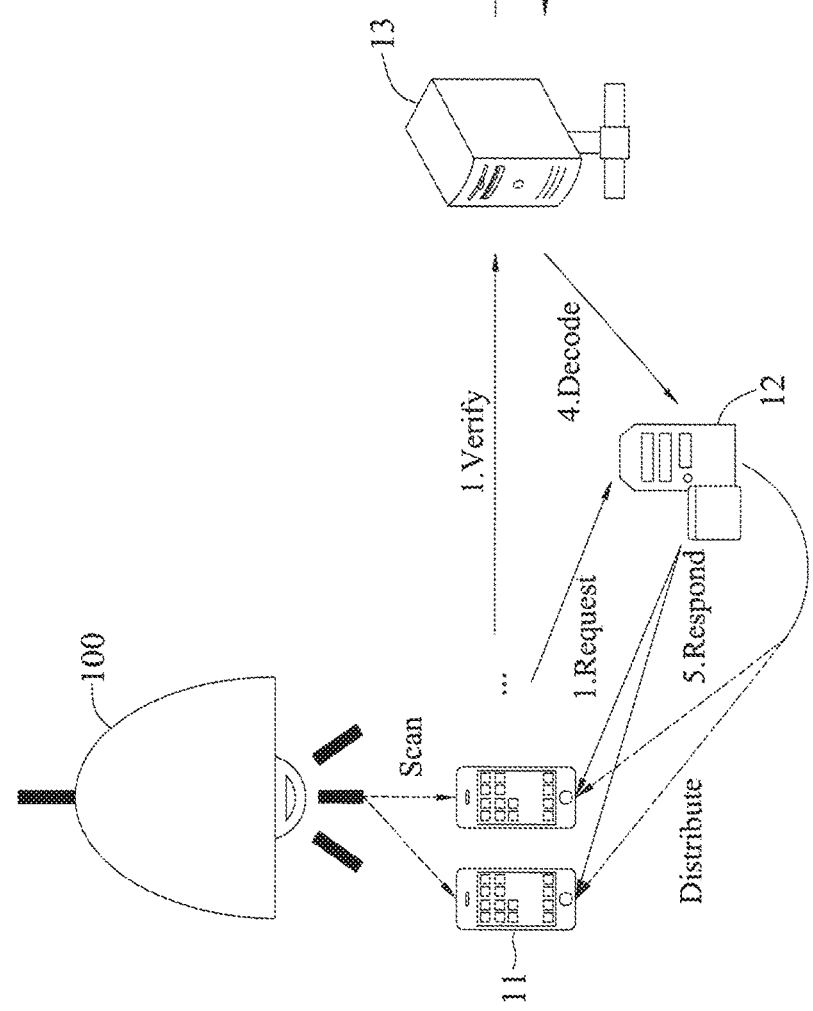
Figure 4B:
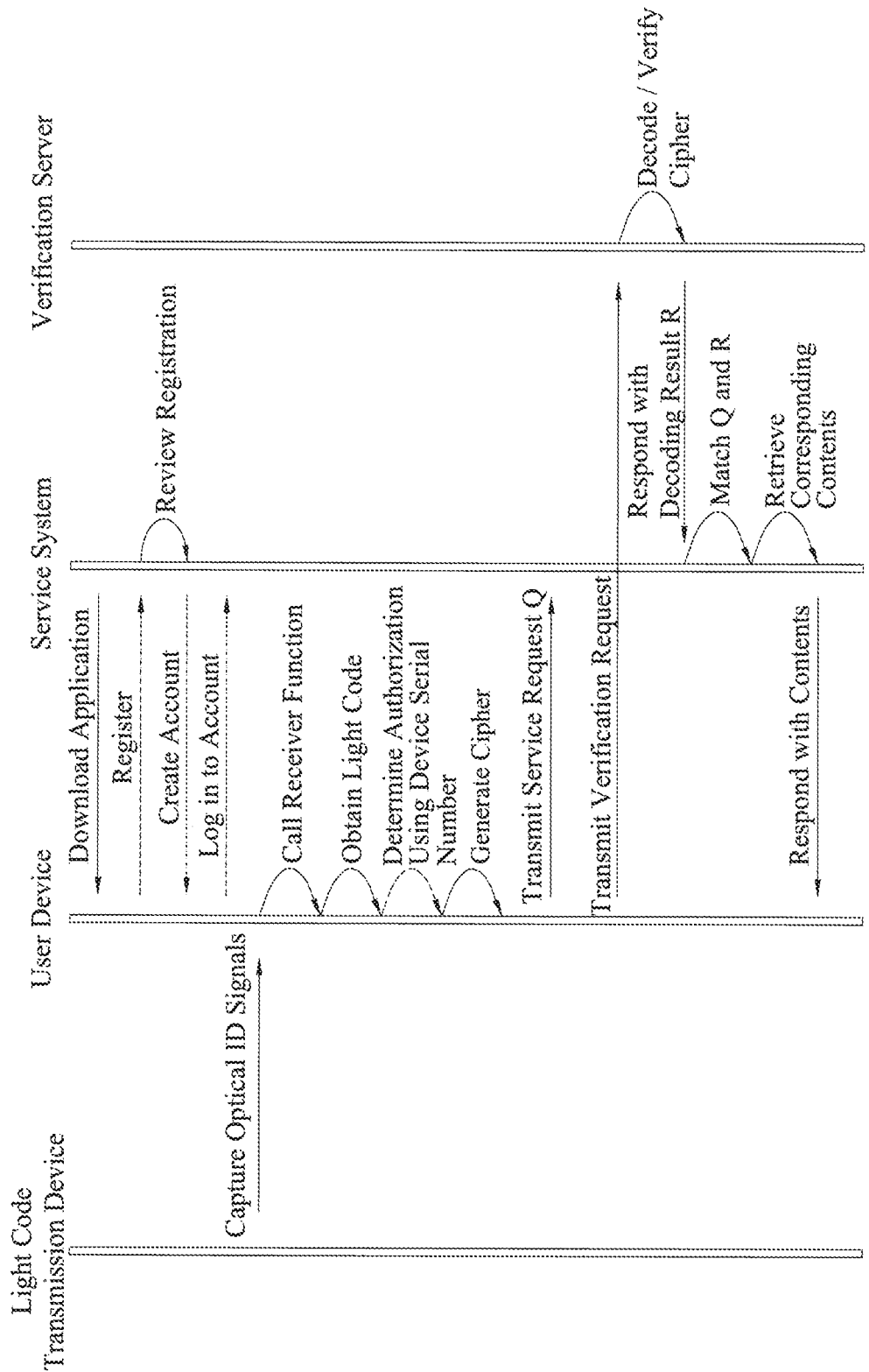

FIGS. 4A and 4B are an operational architecture diagram and a sequence diagram depicting the communication service verification in accordance with a first embodiment of the present disclosure, respectively. As shown in FIG. 4A, the user device 11 obtains a light code from the light code transmission device 100. Afterward the user device 11 sends out a service request to the service system server 12, and a verification request to the verification server 13. The verification server 13 then retrieves a decryption key corresponding to the verification request in a verification table stored in itself or in an external database. Upon obtaining the decryption key, the verification server 13 decodes the cipher. Then, the verification server 13 transmits the decoding result to the service system server 12, and then the service system server 12 provides the corresponding contents to the user device 11.

FIG. 4B is a sequence diagram depicting the first embodiment of the communication service verification, which is similar to the concept of third-party verification. As shown, a corporate client establishes a service system with a function of data communication using OWC, wherein the service system consists of at least a server, a computing service, an application distribution platform or the like. A user device then downloads and installs an application associated with the service system developed by the corporate client, and registers or logs in to an account if required by the application.

As the user device captures optical ID signals from a light code transmission device, the application calls a receiver function according to the service flow. For communication service verification of OWC, the receiver function controls the user device hardware to capture and demodulate optical ID signals to obtain a light code. If the function is tied to a specific light code transmission device, the verification process uses a device serial number of the light code transmission device to determine the authorization. The function uses an encryption method dedicated to the application to generate a cipher. The receiver function transmits respective requests to the service system server and the verification server, wherein the service request Q transmitted to the service system may be encrypted information including, but not limited to, a session identifier, a timestamp, a timeout period, a member account, or a permission level, and the verification request transmitted to the verification server may be encrypted information including, but not limited to, an application identifier, the cipher, the session identifier, or the timestamp.

Upon receiving the verification request, the verification server uses the aforementioned information to retrieve the corresponding decryption key for decoding the cipher, and transmits a response R to the service system. The response may be encrypted information including, but not limited to, a decoding result, a session identifier, or a timestamp. As the service system server confirms that the information contained within the service request Q and the response R (e.g., the session identifier, the timestamp, the timeout period, etc.) is matched, it then retrieves the contents corresponding to the application based on the decoding result or in combination with at least one information, such as the timestamp, the member account, or the permission level, and transmits to the user device.

Figure 5A:
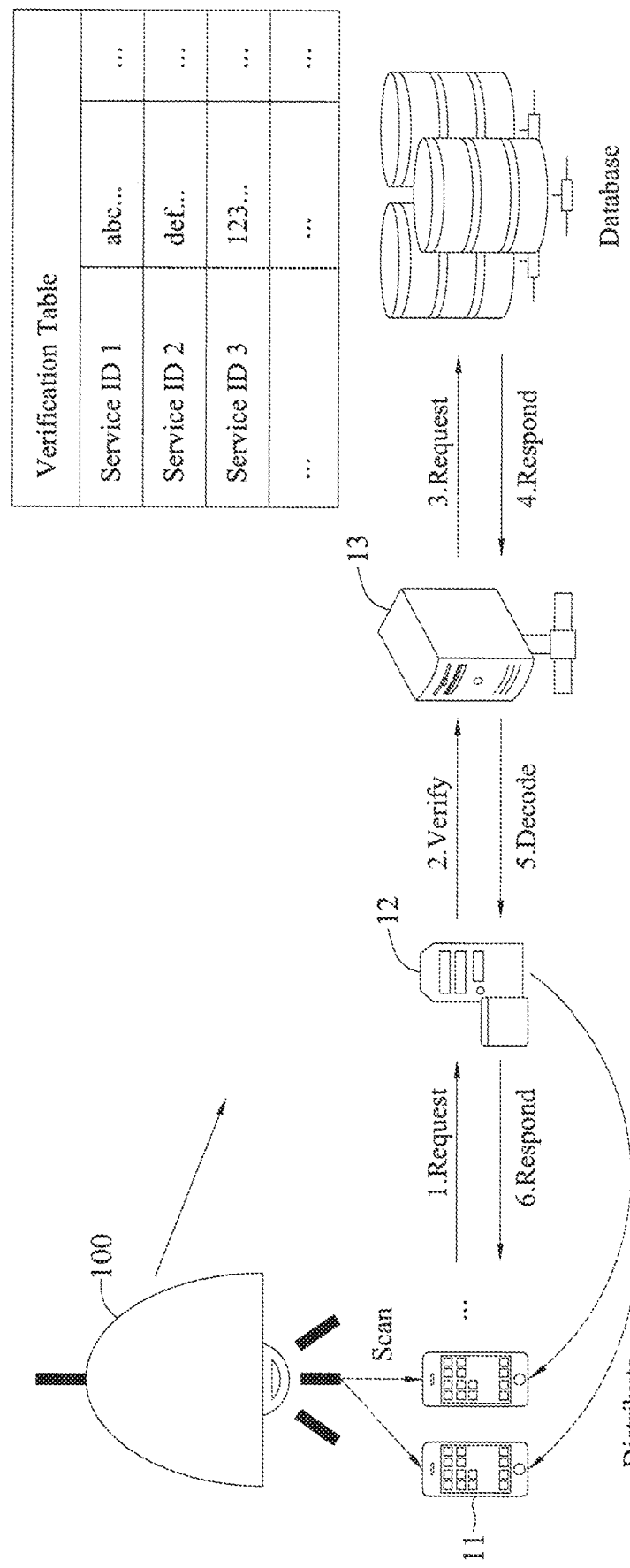
FIGS. 5A and 5B are an operational architecture diagram and a sequence diagram depicting the communication service verification in accordance with a second embodiment of the present disclosure, respectively.
Figure 5B:
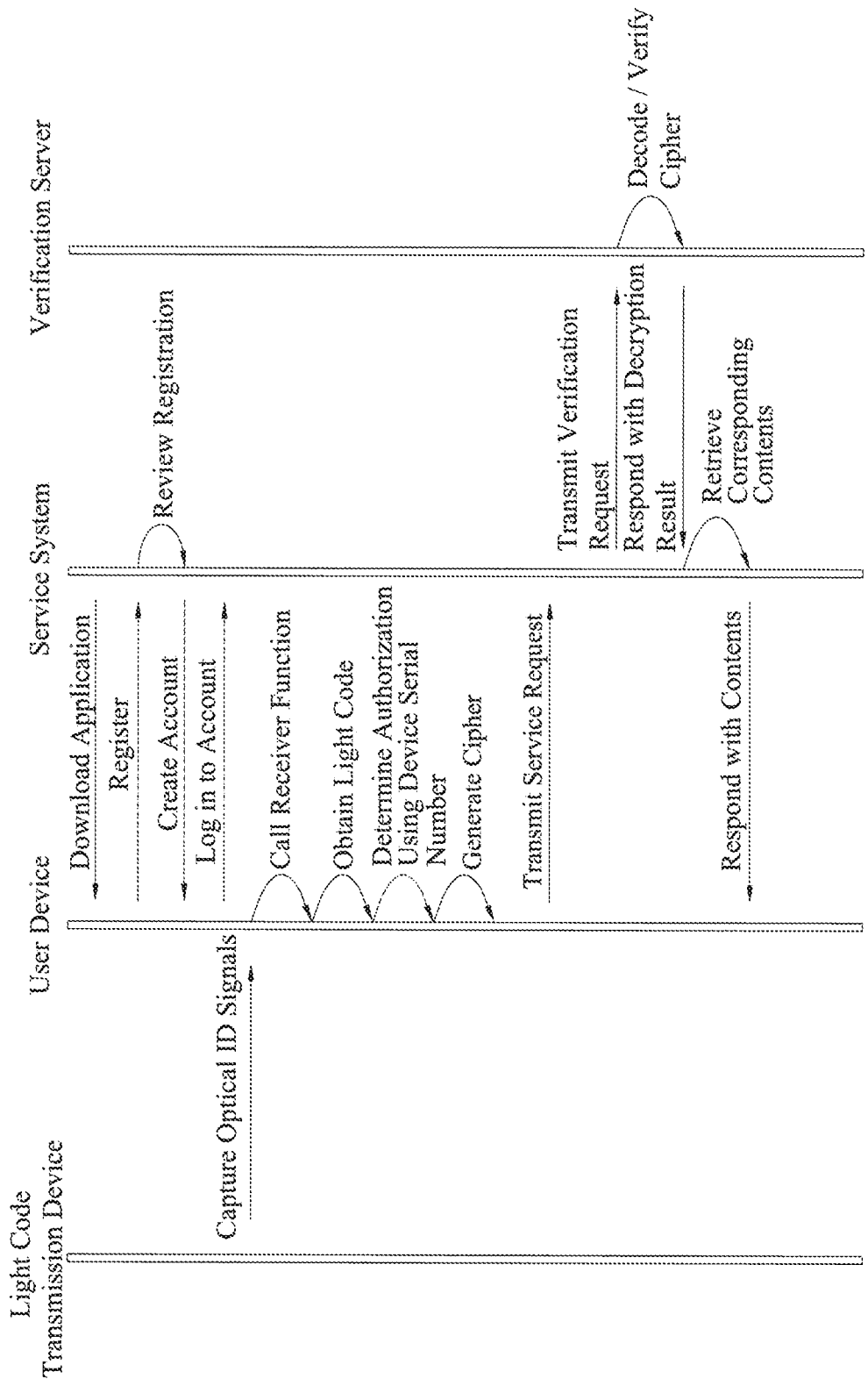

FIGS. 5A and 5B are an operational architecture diagram and a sequence diagram depicting the communication service verification in accordance with a second embodiment of the present disclosure, respectively. As shown in FIG. 5A, the user device 11 obtains a light code from the light code transmission device 100. Afterward the user device 11 sends out a service request to the service system server 12, and the service system server 12 sends a verification request to the verification server 13. The verification server 13 then retrieves a decryption key corresponding to the verification request in a verification table stored in itself or in an external database. Upon obtaining the decryption key, the verification server 13 decodes the cipher. Then, the verification server 13 returns the decoding result to the service system server 12, and then the service system server 12 provides the corresponding contents to the user device 11.

FIG. 5B is a sequence diagram depicting the second embodiment of the communication service verification, which is similar to indirect verification. As shown, the process is similar to that of FIG. 4B, but some of the operations are different. A receiver function of a user device transmits a service request to the service system server, which may be encrypted information including, but not limited to, a session identifier, the cipher, a timestamp, a timeout period, an application identifier, a member account, or a permission level. After checking the information (e.g., the timestamp, the timeout period, the member account, the permission level or the like) contained in the service request, the service system sends a verification request to the verification server. The verification request may be encrypted information including, but not limited to, the application identifier, the cipher, the session identifier, or the timestamp.

Upon receiving the verification request, the verification server uses the aforementioned information to retrieve the corresponding decryption key for decoding the cipher, and transmits a response to the service system. The response may be encrypted information including, but not limited to, a decoding result, a session identifier, or a timestamp. The service system then returns the contents that correspond to the application based on the decoding result or in combination with at least one information, such as the timestamp, the member account or the permission level, to the user device.

Figure 6A:
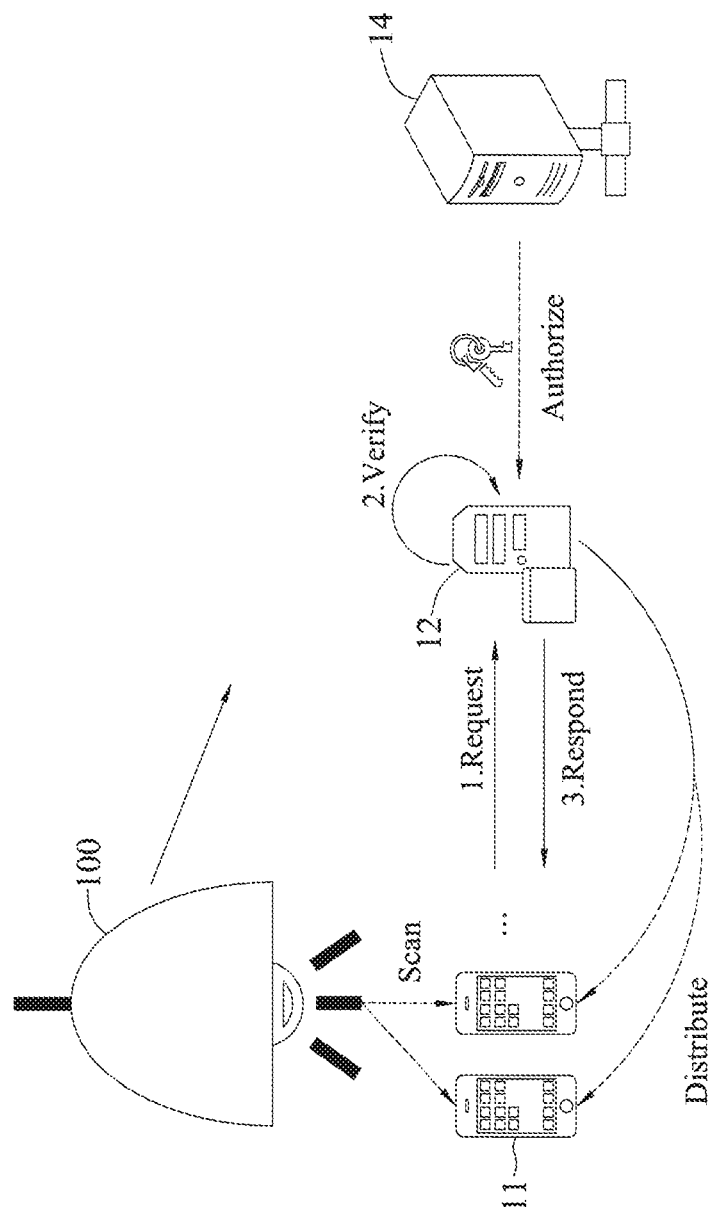
FIGS. 6A and 6B are an operational architecture diagram and a sequence diagram depicting the communication service verification in accordance with a third embodiment of the present disclosure, respectively.
Figure 6B:
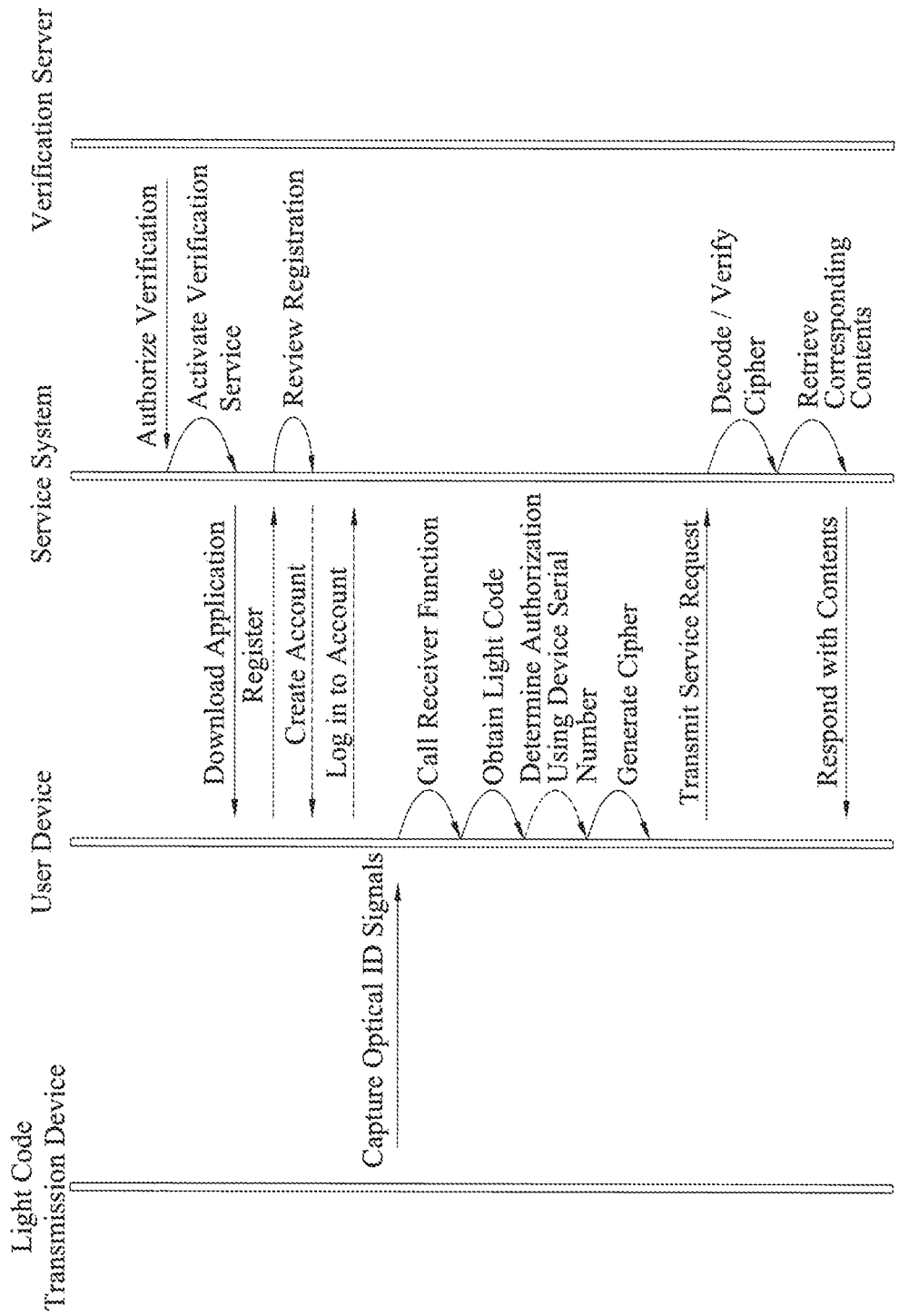

FIGS. 6A and 6B are an operational architecture diagram and a sequence diagram depicting the communication service verification in accordance with a third embodiment of the present disclosure, respectively. As shown in FIG. 6A, the user device 11 obtains a light code from the light code transmission device 100, where the service system server 12 has verification capability, that is, it includes the functions of the verification server 13 in the previous embodiment. When the user device 11 sends out a service request to the service system server 12, the service system server 12 retrieves a decryption key authorized in advance by a key issuing server 14 to directly decode the cipher. Thereafter, the service system server 12 returns the corresponding contents to the user device 11.

FIG. 6B is a sequence diagram depicting the third embodiment of the communication service verification, which is similar to pre-authorized verification. A service system server requests a verification server (i.e., the key issuing server) to authorize a verification agency and activates at least one verification service in the service system server. As a receiver function of a user device transmits a service request to the service system, the service system decodes the cipher using the information (encrypted information such as a session identifier, the cipher, a timestamp, a timeout period, an application identifier, a member account, a permission level or the like) included in the request and the corresponding decryption key, and then returns the contents that correspond to the application based on the decoding result or in combination with at least one information, such as the timestamp, the member account, or the permission level, to the user device.

Figure 7A:
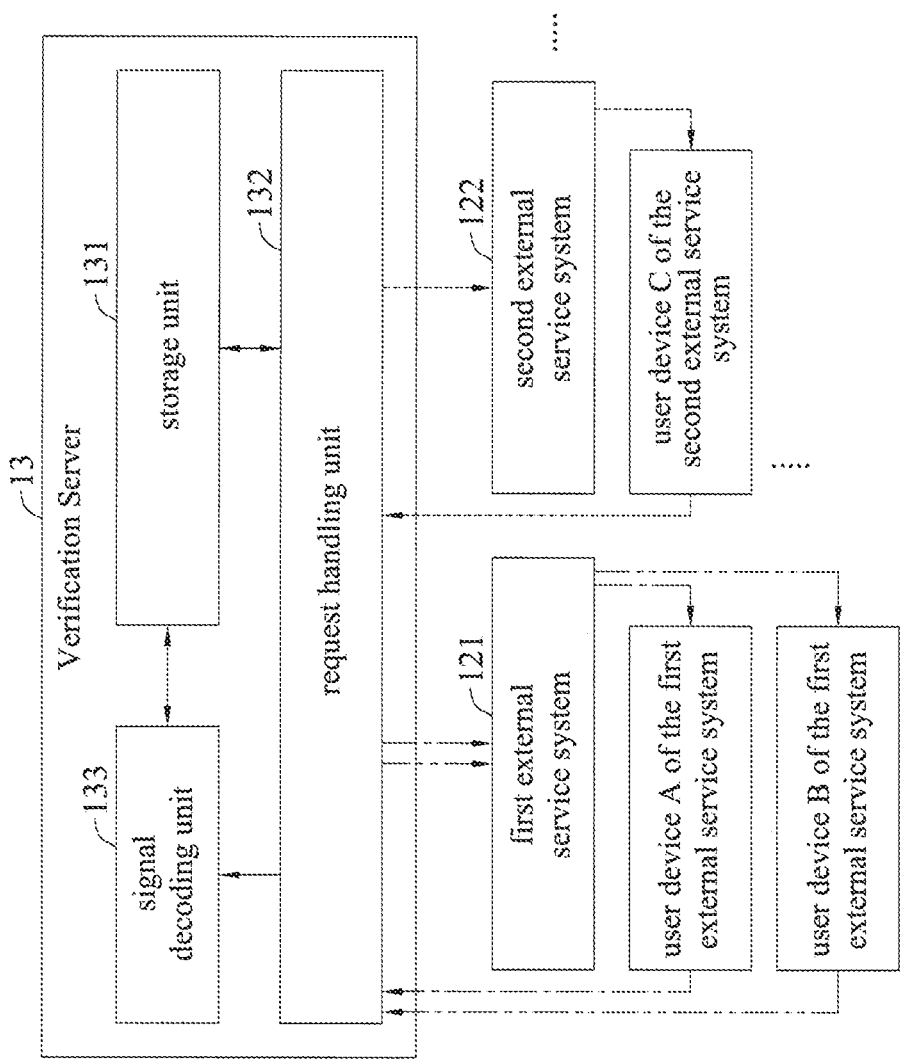
FIGS. 7A and 7B are a block diagram and a flowchart depicting the verification server in accordance with a first embodiment of the present disclosure, respectively.
Figure 7B:
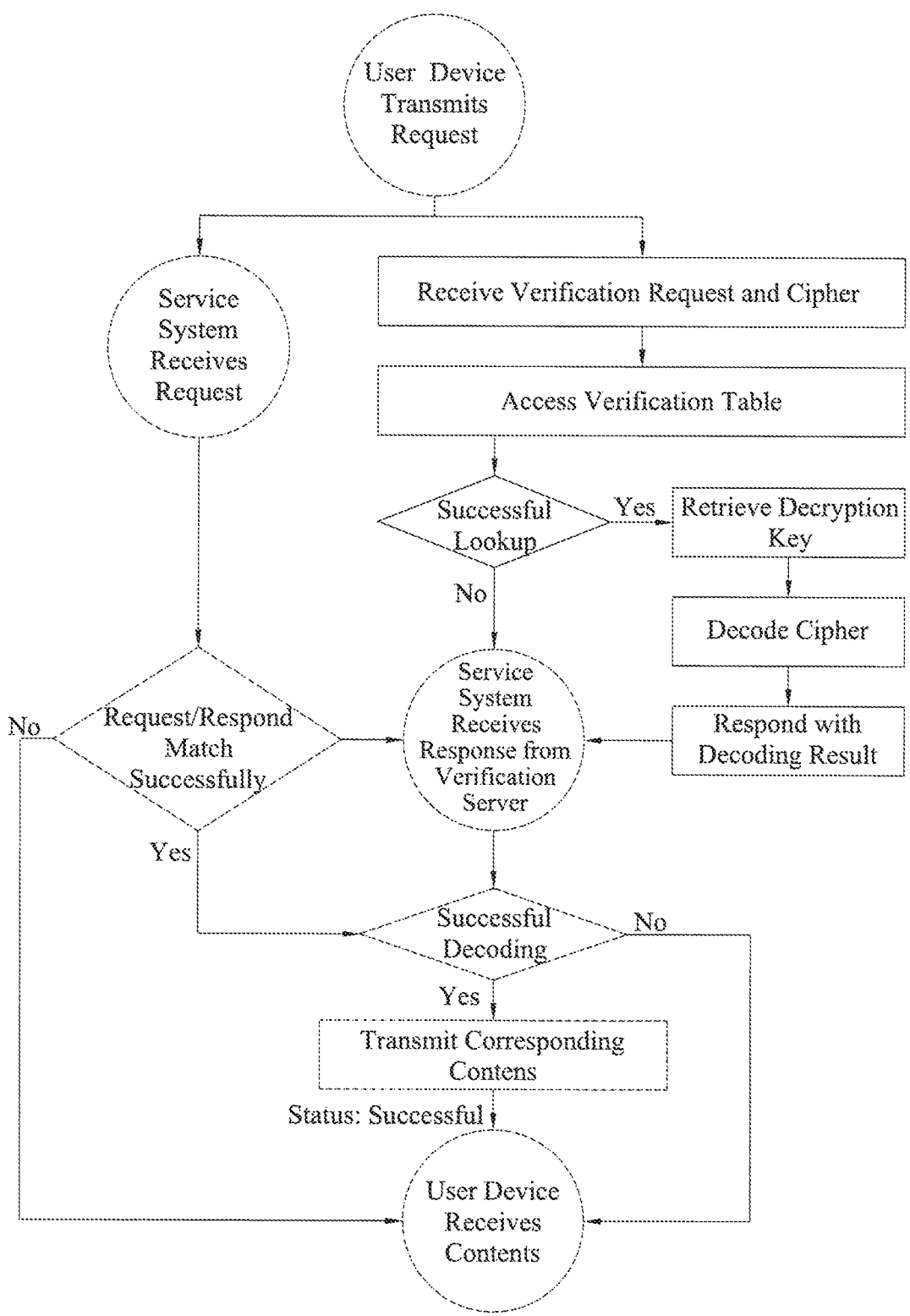

FIGS. 7A and 7B are a block diagram and a flowchart depicting the verification server in accordance with the first embodiment of the present disclosure, respectively. The verification server is used for receiving at least one verification request and retrieving a decryption key from a verification table based on the service system parameters in the verification request, and a cipher contained in the verification request is decoded using the decryption key to return a decoding result to a corresponding service system server. The service system server then transmits the corresponding contents to a user device.

The verification server 13 includes a storage unit 131, a request handling unit 132 and a signal decoding unit 133. The storage unit 131 is used for storing a verification table that contains service system parameters associated with a plurality of service systems and their respective decryption keys. The request handling unit 132 is used for receiving an external verification request, which includes a cipher and the service system parameters of a corresponding service system. The signal decoding unit 133 is used for retrieving, based on the verification request, a decryption key from the verification table, so as to decode the cipher using the decryption key to get a decoding result, which is returned via the request handling unit 132.

FIG. 7A shows the system architecture of the first embodiment of the verification server. This architecture corresponds to the architecture shown in FIG. 4A. The verification server 13 receives an external request via the request handling unit 132. The verification server 13 may receive requests from different service systems, such as a first external service system 121 and a second external service system 122. User devices A and B of the first external service system 121 and a user device C of the second external service system 122 directly send verification requests to the verification server 13. After verification, the verification server 13 sends respective decoding results to the external service systems 121/122, which then provide the corresponding contents to the user devices A, B and C.

The flowchart of the verification server in this embodiment is shown in FIG. 7B, in which a user device sends a service request to the service system server, and also sends a verification request to the verification server.

Figure 8A:
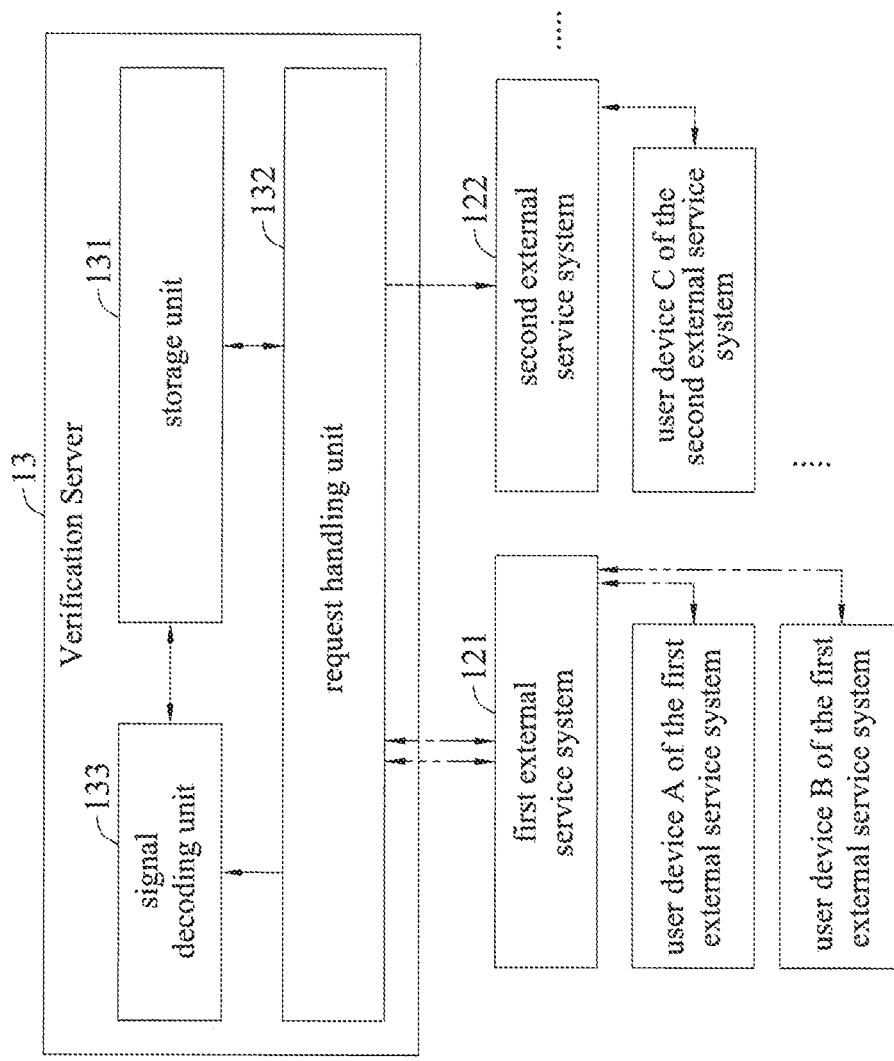
FIGS. 8A and 8B are a block diagram and a flowchart depicting the verification server in accordance with a second embodiment of the present disclosure, respectively.
Figure 8B:
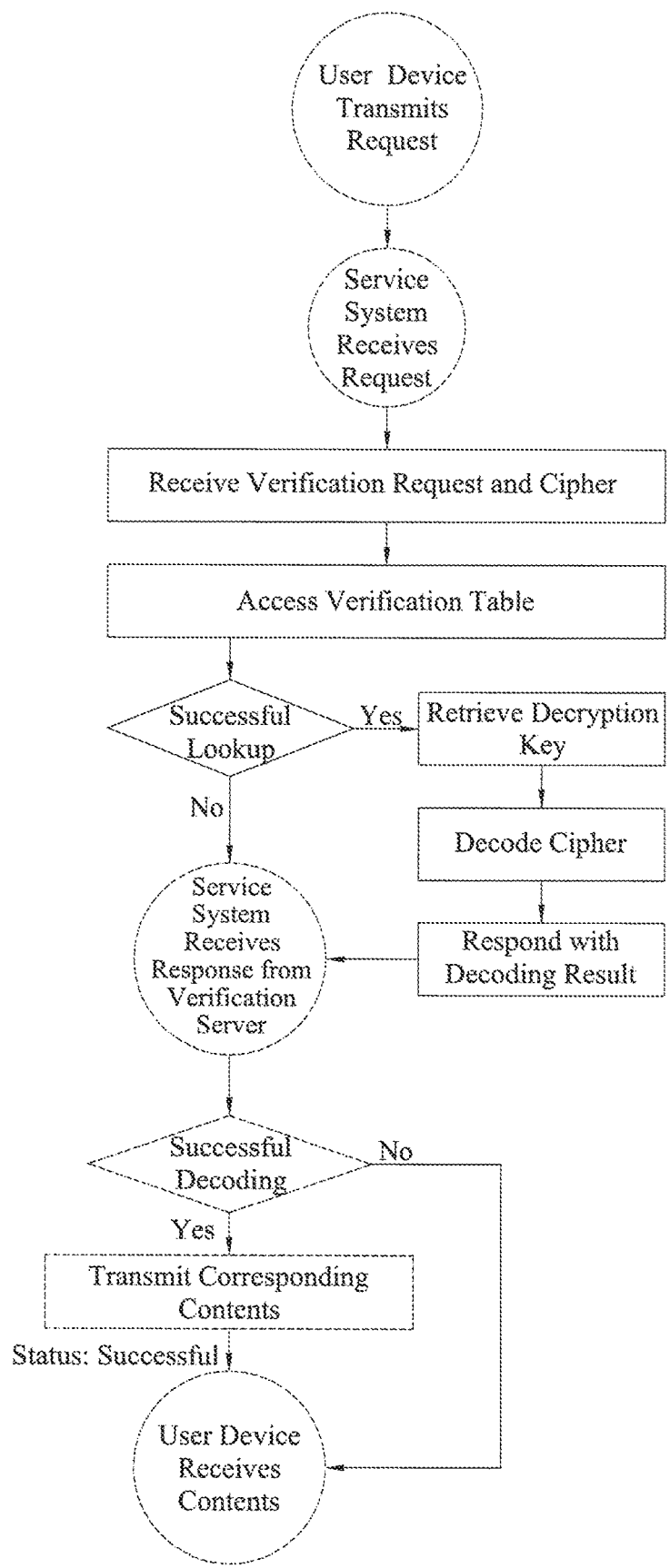

FIGS. 8A and 8B are a block diagram and a flowchart depicting the verification server in accordance with a second embodiment of the present disclosure, respectively, wherein the architecture of the verification server 13 and that described above are the same. FIG. 8A shows the system architecture of the second embodiment of the verification server. This architecture corresponds to the architecture shown in FIG. 5A. The verification server 13 receives an external request via the request handling unit 132. The verification server 13 may receive requests from different service systems, such as a first external service system 121 and a second external service system 122. User devices A and B of the first external service system 121 send requests to the first external service system 121, and a user device C of the second external service system 122 sends a request to the second external service system 122. The first external service system 121 and the second external service system 122 in turn send verification requests to the verification server 13. In other words, the user devices A, B and C do not directly send verification requests to the verification server 13. After verification, the verification server 13 sends respective decoding results to the external service systems 121/122, which then provide the corresponding contents to the user devices A, B and C.

The flowchart of the verification server in this embodiment is shown in FIG. 8B, in which a user device only sends a service request to the service system server. The service system server in turn sends a verification request to the verification server.

Figure 9A:
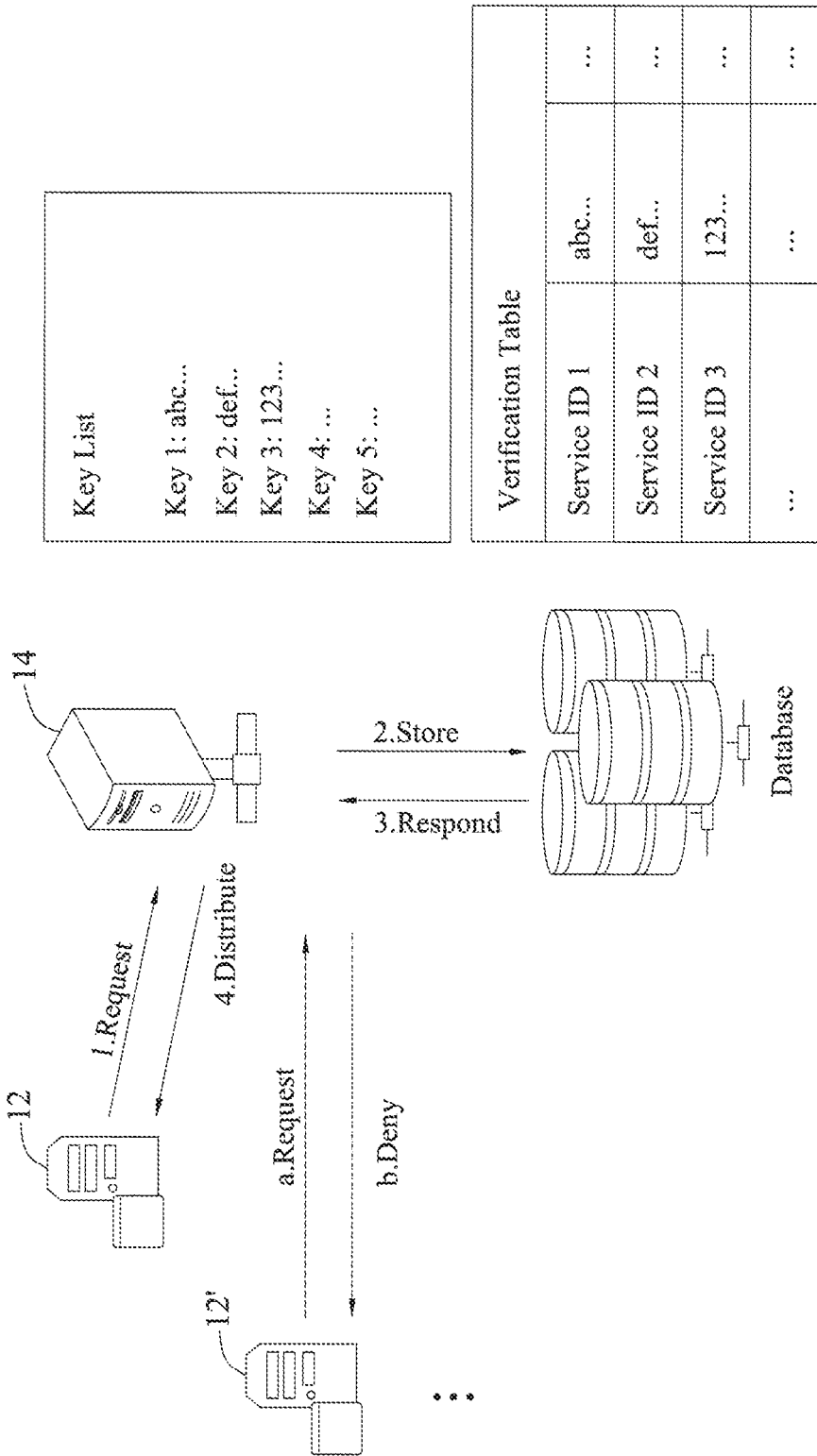
FIGS. 9A to 9C are operational architecture diagram, block diagram, and flowchart depicting a key issuing server in accordance with the present disclosure, respectively.
Figure 9B:
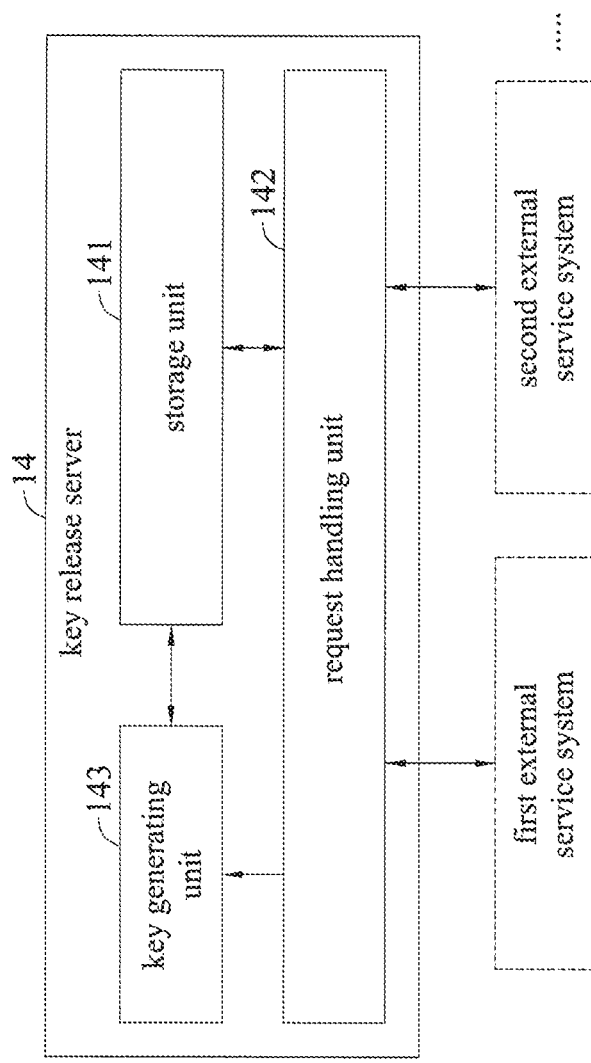
Figure 9C:
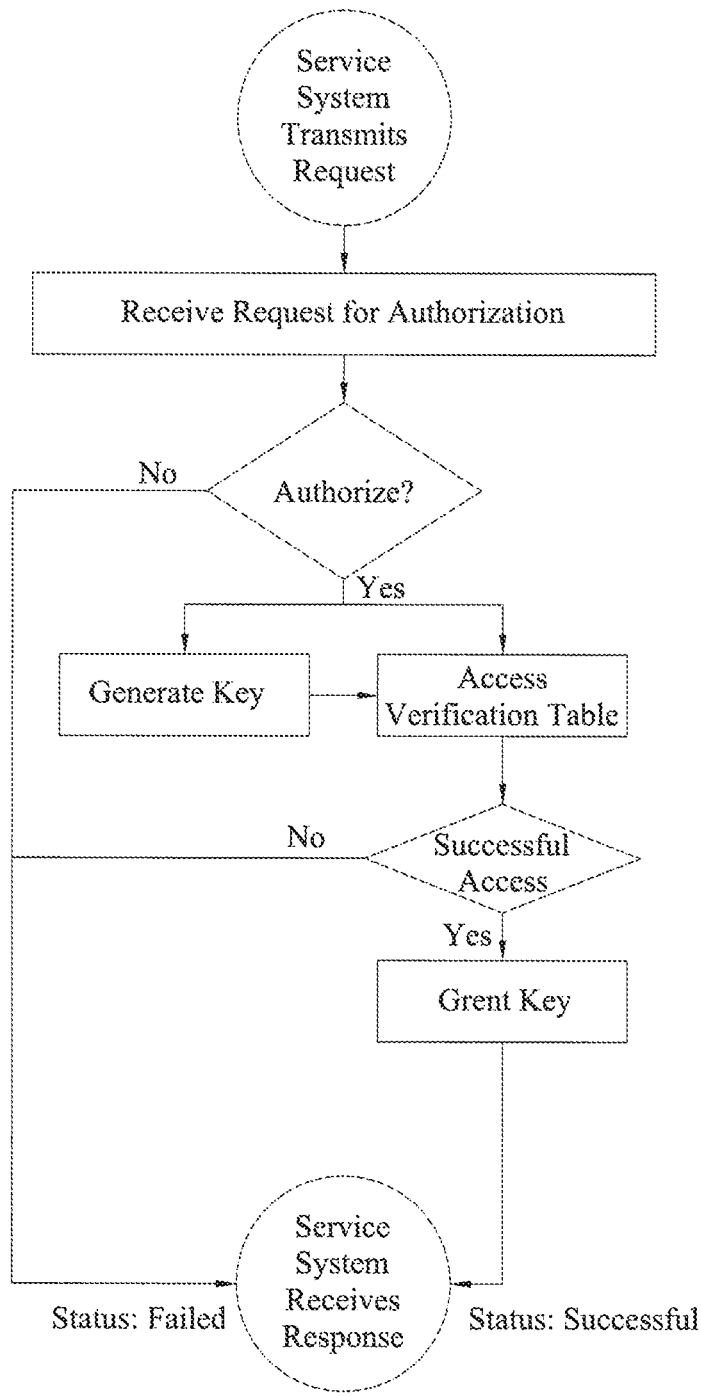

FIGS. 9A to 9C are operational architecture diagram, block diagram, and flowchart depicting a key issuing server in accordance with the present disclosure, respectively. As shown in FIG. 9A, before establishing a service system with a function of data communication using OWC, the service system server 12 needs to send a request for authorization to the key issuing server, and a corresponding receiver function is then obtained for the development of an application associated with the service system. The authorized service system parameters and the associated decryption keys are recorded in a verification table stored in the verification server or an external database.

Moreover, under the architecture of FIG. 6A in which verification is carried out by the service system, the key issuing server 14 pre-authorizes the service system to perform verification. As shown in FIG. 9A, the service system server 12 requests the key issuing server to authorize a verification agency, the key issuing server 14 generates an encryption key according to data (e.g., device serial numbers) provided by the specific service system server 12. In an embodiment, the corresponding service system parameters and the decryption key are recorded in the verification table. Thereafter, in addition to providing the receiver function for developing an application associated with the service system, the key issuing server 14 also grants the decryption key to the service system server 12 to authorize it to act as a verification agency. Therefore, when a user device sends a service request, the service system server 12 performs verification itself. The service system server 12' indicates an aspect in which the request for authorization is denied.

As shown in FIG. 9B, the key issuing server 14 includes a storage unit 141, a request handling unit 142 and a key generating unit 143. This architecture is similar to that of the verification server 13. Thus, the verification server may also have the capability of key authorization. In other words, a key generating unit is included in the verification server 13 of FIG. 7A or 8A above, which is connected to the storage unit 131/141 and the request handling unit 132/142. The key generating unit 143 is used for generating an encryption key based on a request for authorization from a service system server. In an embodiment, the encryption key is included in the receiver function to be used in the development of an application associated with the service system having a function of data communication using OWC. The corresponding service system parameters and the decryption key are stored in a verification table. The encryption key can be used for encrypting the payload carried by a light code to generate a cipher.

FIG. 9B shows the system architecture of a standalone key issuing server. The key issuing server 14 can be used for generating a key list containing at least a key, and providing a receiver function for a service system. The service system parameters and the decryption key associated with the receiver function will be recorded in a verification table. The key issuing server 14 includes the storage unit 141, the request handling unit 142 and the key generating unit 143. The request handling unit 142 may receive and respond to requests for authorization made by at least a service system server. The key generating unit 143 is used for generating at least one key for encrypting/decoding. The storage unit 141 stores a verification table recording service system parameters and decryption keys of at least one service system.

It should be noted that the function of key issuing can be provided by the verification server or an external key issuing server 14, and the present disclosure does not limit the way the keys are issued.

The flowchart of key issuing server of this embodiment is shown in FIG. 9C, wherein the service system server sends a request for authorization to the key issuing server 14. Upon approving authorization, the key issuing server 14 grants keys.

Figure 10A:
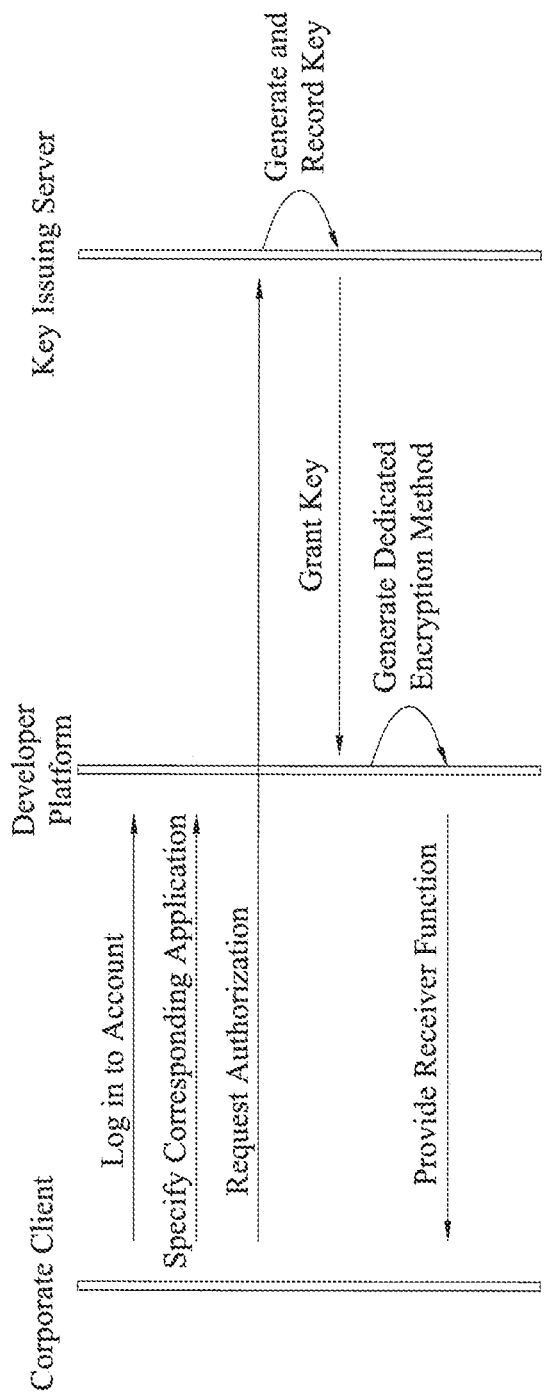
FIGS. 10A and 10B are sequence diagrams illustrating procedures of key issuance related to different embodiments of the present disclosure.
Figure 10B:
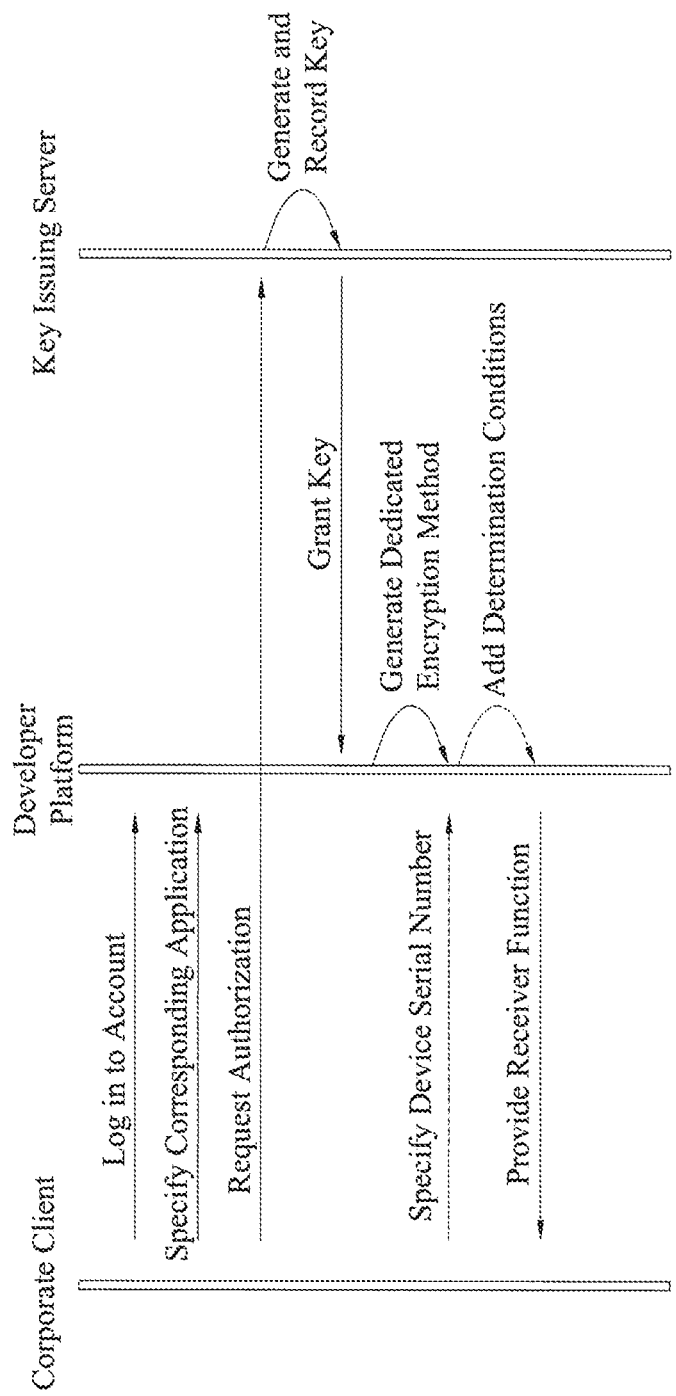

FIGS. 10A and 10B are sequence diagrams illustrating procedures of key issuance related to different embodiments of the present disclosure. In FIG. 10A, the key issuing server grants the application associated with a service system a key. A communication service provider hosts a developer platform and a key issuing server. A corporate client wishing to establish a service system (i.e., the service system server) with a function of data communication using OWC needs to have a developer account. After logging in, the corporate client specifies an application corresponding to the service system and asks for authorization, wherein the developer platform may monitor the requests from external service systems. The key issuing server then receives the request for authorization and generates at least a key for encrypting/decoding, and the decryption key and the service system parameters are recorded in a verification table.

The key granted to the developer platform by key issuing server is used for encrypting the payload carried by the light code to generate a cipher. Thus, the developer platform may create an encryption method dedicated to the application based on this key, and may further encapsulate functionalities such as hardware control, optical ID signal demodulation, and verification request transmission into a receiver function for the corporate client during the development of an application, such that the application is able to capture optical ID signals and verify an identifier of a light code to obtain the corresponding contents.

In FIG. 10B, the key issuing server additionally utilizes device serial number for device binding and grants the application associated with a service system a key. Device binding allows corporate clients to provide communication service via certain light code transmission devices through specifying device serial numbers on the developer platform. A receiver function including functionalities such as an encryption method dedicated to the application, hardware control, optical ID signal demodulation, verification request transmission and device binding is encapsulated for the corporate client during the development of an application, such that the application is able to capture optical ID signals and verify part of the light code, e.g., a device serial number, an identifier, or a combination of both, to obtain the corresponding contents.

Moreover, the present disclosure employs different combinations of authorized keys and light codes to create diverse value-added services. That is, authorized service systems generate ciphers and verification requests based on different receiver functions to obtain decoding results that correspond to different contents. For example, a first service system provides interactive marketing service using OWC, and its user's user device may obtain a light code for the corresponding information such as traceability data of products or promotion vouchers; a second service system provides indoor positioning service using OWC, and its user's user device may turn the service in a map application on to obtain a light code for the location information; and a third service system provides ticket verification service using OWC, and its user's user device may start an electronic ticket application and place it near a ticket verification device embedded with a light code transmission device to obtain a light code for offline bidirectional verification, detailed implementations can be found in TW Patent Application No. 105138728 by the same applicant. The service system may also use the decoding result in conjunction with at least one information (e.g., a timestamp, a member account, a permission level, etc.) to determine the corresponding contents in the application. For example, a member with an "A" permission level may obtain both the traceability data of products and promotion vouchers after obtaining a light code, while another member with a "B" permission level may obtain only the traceability data of products after obtaining the light code. Thus, optical ID signals emitted by a single light code transmission device may correspond to different contents.

The system and method for communication service verification and a verification server thereof according to the present disclosure enable consumers' visual associations between objects and information during interaction. The system and method for communication service verification and a verification server thereof according to the present disclosure also have a long communication range while not affecting the design and aesthetic of the original display space, and further allow multiple user devices within communication range to simultaneously capture the optical ID signals, improving traffic flow in physical stores and venues. In addition, through the key issuance mechanism, a light code received by each authorized application can be encrypted by a granted key, thereby allowing the light code to be transmitted in cipher and its validity to be verified before the contents corresponding to the light code is transmitted to the user device. This prevents unauthorized access of the contents.

In an exemplary embodiment, the service system server and verification server may be a server, a workstation or a cluster of computers with computing capability. They use at least one central processing unit (CPU) to implement steps of the embodiments. In an exemplary embodiment, the service system server and verification server are implemented by the Application-specific Integrated Circuit (ASIC, or known as the Application-specific IC) to execute all or part of steps in each embodiment of the present disclosure. However, in another embodiment, each of them may also be implemented by a processing unit.

The above embodiments are only used to illustrate the principles of the present disclosure, and should not be construed as to limit the present disclosure in any way. The above embodiments can be modified by those with ordinary skill in the art without departing from the scope of the present disclosure as defined in the following appended claims.

What is claimed is:

1. A system for communication service verification, comprising:
   a user device configured for obtaining a light code from a light code transmission device, demodulating the light code to obtain a payload carried by the light code, and encrypting the payload to generate a cipher;
   a service system server configured for receiving a service request from the user device; and
   a verification server configured for receiving a verification request including the cipher from the user device or the service system server, wherein the verification server obtains a decryption key recorded in a verification table based on the verification request and decodes the cipher using the decryption key to obtain a decoding result, wherein when the verification server receives the verification request from the service system server, the cipher is transmitted along with the service request to the service system server, and
   wherein the decoding result is transmitted to the service system server, and the service system server retrieves contents corresponding to the service request based on the decoding result and transmits the contents to the user device.

2. The system of claim 1, wherein the verification table is stored in an external database or within the verification server.

3. The system of claim 1, wherein the verification server further includes: a storage unit configured for storing a verification table that contains service system parameters and the decryption key associated with the service request; a request handling unit configured for receiving the verification request, wherein the verification request includes the cipher and the service system parameters of a corresponding service system; and a signal decoding unit for retrieving the decryption key corresponding to the service system parameters from the verification table and decoding the cipher using the decryption key to obtain the decoding result.

4. The system of claim 1, wherein the service system server and the verification server are provided in at least one apparatus, and when the service system server and the verification server are provided in a same apparatus, the service system server obtains in advance the decryption key from a key issuing server to perform verification upon receiving the verification request.

5. The system of claim 1, wherein the light code includes a device serial number and an identifier.

6. A method for communication service verification, comprising:
   obtaining, by a user device, a light code from a light code transmission device;
   demodulating, by the user device, the light code to obtain a payload carried by the light code and encrypting the payload to generate a cipher;
   receiving, by a service system server, a service request from the user device;
   receiving, by a verifications server, a verification request from the service system server, wherein when the verification server receives the verification request from the service system server, the cipher is transmitted along with the service request to the service system server; and
   retrieving, by the verification server, a decryption key recorded in a verification table based on the verification request and decoding the cipher in the verification request using the decryption key to obtain a decoding result.

7. The method of claim 6, further comprising transmitting the decoding result to the service system server, and retrieving, by the service system server, contents corresponding to the service request based on the decoding result and transmitting the contents to the user device.

8. The method of claim 6, wherein the decryption key is recorded in a verification table stored in an external database or within the verification server.

9. A verification server for performing decoding and verification for a communication service, the verification server comprising:
   a storage unit configured for storing a verification table related to a plurality of service system parameters of a plurality of service systems and decryption keys corresponding to the service system parameters;
   a request handling unit configured for receiving a verification request from a service system server or a user device, wherein the verification request includes a cipher and the service system parameters of the service system server, wherein a light code obtained by the user device is demodulated to obtain a payload carried by the light code and the payload is encrypted to generate the cipher, and wherein when the verification request is received from the service system server, the cipher is transmitted along with a service request from the user device to the service system server; and a signal decoding unit configured for retrieving the decryption keys corresponding to the service system parameters from the verification table, decoding the cipher using the decryption key to obtain a decoding result, and returning the decoding result via the request handling unit.

10. The verification server of claim 9, wherein the decoding result is transmitted to the service system server, and the service system server provides contents corresponding to the service request to the user device.

11. The verification server of claim 9, further comprising a key generating unit having a capability of key authorization of a key issuing server for generating an encryption key based on a request for authorization from the service system server and recoding the decryption key and the corresponding service system parameters in the verification table, wherein the encryption key is provided for encrypting a payload carried by the light code to generate the cipher.

12. The verification server of claim 11, wherein the key issuing server is configured for generating the encryption key, the service system parameters and the decryption key based on the request for authorization from the service system server, the encryption key is included in a receiver function for development of an application associated with a service system having a function of data communication using the communication service, and the service system parameters and the decryption key are recorded in the storage unit, or the decryption key is granted to the service system server to authorize a verification agency.

* * * * *